United States Patent [19]

Whyde

[11] Patent Number: 4,598,447
[45] Date of Patent: Jul. 8, 1986

[54] FARRIER'S FILE/RASP

[75] Inventor: George J. Whyde, Xenia, Ohio

[73] Assignee: File Sharpening Company, Xenia, Ohio

[21] Appl. No.: 767,393

[22] Filed: Aug. 19, 1985

Related U.S. Application Data

[63] Continuation-in-part of Ser. No. 652,786, Sep. 20, 1984, abandoned.

[51] Int. Cl.$^4$ .............................................. B23D 71/00
[52] U.S. Cl. ......................................................... 29/78
[58] Field of Search ................................. 29/78, 79, 80

[56] References Cited

U.S. PATENT DOCUMENTS

| | | | |
|---|---|---|---|
| 94,503 | 9/1869 | Nicholson | 29/78 |
| 383,999 | 6/1888 | Stokes | 29/78 |
| 416,805 | 12/1889 | Ridge | 29/78 |
| 499,619 | 6/1893 | Weed | 29/78 |
| 507,071 | 10/1893 | Huff | 29/78 |
| 672,780 | 4/1901 | Kellermann | 29/78 |
| 2,460,513 | 2/1949 | LeFevre | 29/78 |

FOREIGN PATENT DOCUMENTS

| | | | |
|---|---|---|---|
| 254247 | 7/1926 | United Kingdom | 29/78 |
| 456868 | 11/1936 | United Kingdom | 29/78 |

Primary Examiner—Leonidas Vlachos
Attorney, Agent, or Firm—Biebel, French & Nauman

[57] ABSTRACT

A file/rasp tool has upstanding teeth with curved cutting edges, arranged in a plurality of rows. The rasp teeth are of generally pyramidal shape and have a cutting face with a positive rake or slope, such cutting face being defined by upwardly converging side edges surmounted by a cutting tip or edge of generally arcuate configuration having a radius of curvature at least equal to the depth of the teeth. The file teeth have cutting edges including a cap portion at the tip of the tooth and extending therefrom at a forward angle to the front face of the tooth. Such tooth configurations provide a tool which has an extended useful life.

5 Claims, 10 Drawing Figures

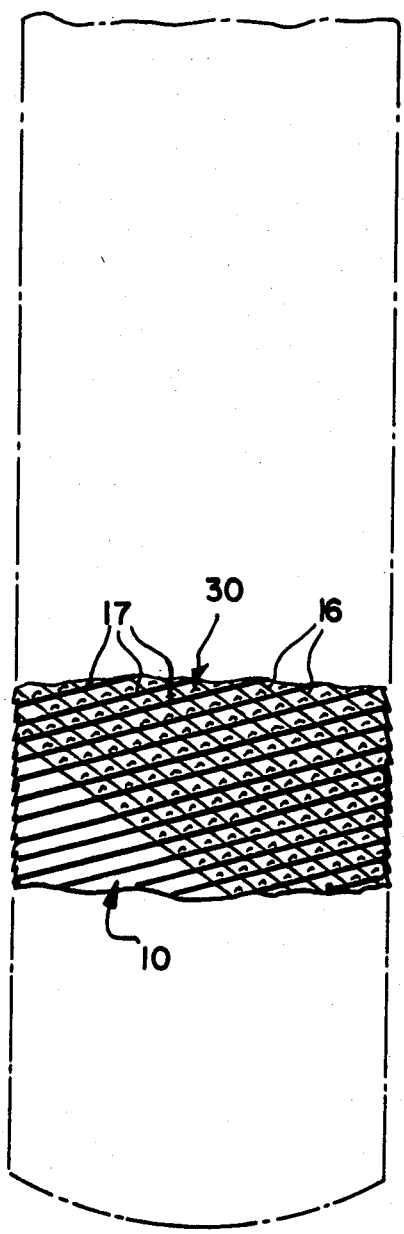
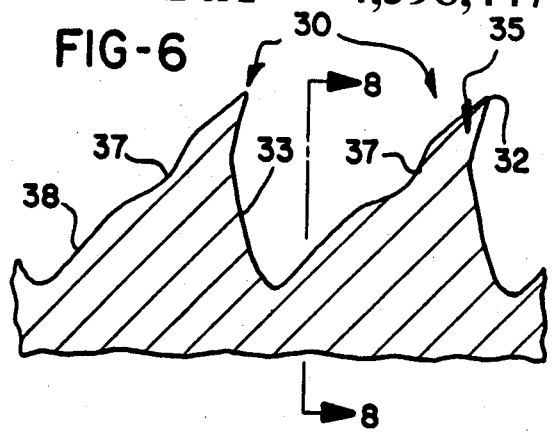
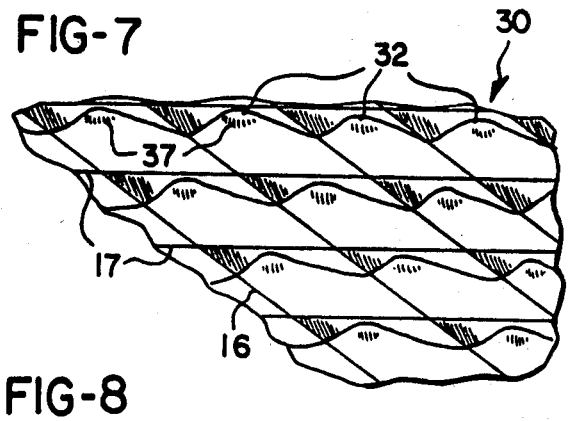
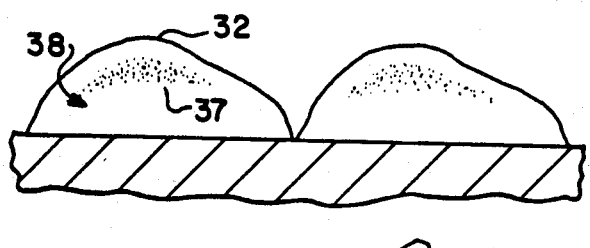
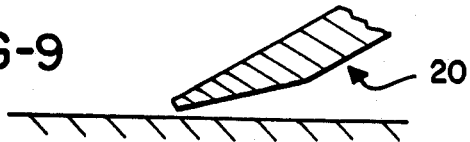
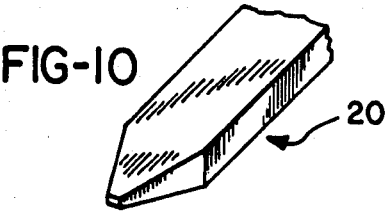

FARRIER'S FILE/RASP

CROSS-REFERENCE TO RELATED APPLICATION

This application is a continuation-in-part of copending U.S. patent application Ser. No. 652,786 filed Sept. 20, 1984 entitled Farrier's File/Rasp, now abandoned.

BACKGROUND OF THE INVENTION

This invention relates to cutting tools which are commonly known as files and rasps; rasps are defined as files with individual protruding teeth, whereas files generally have teeth formed by cross-cuts which extend across a face of the file body, usually at an angle, at some regular spacing. The invention is particularly concerned with file/rasps used by ferriers in the treatment and shoeing of hoofed animals, usually horses. Such tools are constructed by upsetting the surface of a steel blank of appropriate size and shape to form rows of tooth-like projections protruding from the rasp side surface of the blank. On the file side of the tool the teeth are formed by upsetting spaced rows of material by making elongated straight cuts (called the over cut) into the blank at regular spacing, usually at a selected angle to the longitudinal center-line of the tool, and then making other cuts (called the upper cuts) across the first set, at a predetermined angle thereto. This results in formation of teeth at the intersections of the cuts. The tool may then be hardened and subsequently the edges of the teeth sharpened by a sand blasting operation.

The resulting teeth have a more or less pointed tip, and in use these tooth tips dull and become rounded, at which point it is virtually imposssible to re-sharpen them and the tool must be discarded. In the prior art, U.S. Pat. No. 94,503 to Nicholson, U.S. Pat. No. 383,999 to Stokes, U.S. Pat. No. 416,805 to Ridge, and U.S. Pat. No. 499,619 to Weed are typical of such pointed rasp teeth. Such teeth are characterized as having either positive or negative angle teeth. This angle is referenced to the slope of the face of the tooth facing the normal direction of cutting; thus a negative or scraping tooth has a face extending upward and rearward to the tooth tip in the direction of cutting, while a positive tooth has a face which is undercut, or extends beneath the tip, so as to slope upward and forward toward the direction of cutting. A negative tooth gives a scraping action with little material removal, a smoothing type of action, while a positive tooth gives a cutting action which will remove material but also may tend to clog with particles of the material forced under the positive tooth. It is important to achieve the best cutting action while also minimizing clogging, and maintaining a sharp tooth tip for as long a use time as possible.

In a tool having a rasp configuration on one side, particularly for ferriers, it is often customary to form a double-cut file surface on the opposite side of the tool blank. British Pat. No. 254,247 (1926) to Ufer and British Pat. No. 456,868 (1936) to Nicholson are typical of such file surfaces.

SUMMARY OF THE INVENTION

The present invention provides improved tooth structures for such rasp/file tools. The rasp teeth are struck up from the tool body in the general form of pyramids, each of which has upwardly and inwardly directed sides surmounted by a curved cutting tip at the top of a raked tooth, that is, a tooth which has a forward cutting wall or face of positive slope. The tip part of the curved edge of the forward tooth face has a curved edge with a radius of curvature which is essentially uniform and greater than (or at least equal to) the depth of the tooth. A rasp surface constructed with teeth of this configuration will retain its sharpness longer, due to the length and configuration of each tooth cutting edge, and due to the fact that wear of this cutting edge will tend to be distributed along the curved tip, will not interfere with the ability of the tooth to clear itself of bits of removed material, and will in general result in a longer useful life of the sharp tool.

The file side of the tool is of the double-cut type, and the cutting edge of the file teeth are provided as a cap extending along the major part of the edge and directed at an angle to the front face of the file tooth, toward the direction of cutting motion of the tool. The sharpened edge of this cap also has a somewhat curved or arcuate edge. A double cut file surface of this type will minimize clogging with chips of cut material since the shape of the teeth tends to be self-clearing.

Therefore it is a principal object of the invention to provide a novel file/rasp tool, having upstanding rasp teeth generally of pyramid shape having upwardly and inwardly extending sides on the front face and surmounted by curved cutting tips, arranged in a plurality of rows, and in which the rasp teeth have a forward cutting face or surface having positive rake or slope, such cutting edge or tip being of generally arcuate configuration having a radius of curvature at least equal to the depth of the teeth; to provide such a tool in which the file teeth cutting edges include a cap portion at the of the tooth and extending therefrom at a forward angle to the front face of the tooth; and to provide such a tool which has an extended useful life.

Other objects and advantages of the invention will be apparent from the following description, the accompanying drawings and the appended claims.

BRIEF DESCRIPTION OF THE DRAWINGS

FIG. 2 is a partial view similar to FIG. 1, showing the file side of the tool;

FIG. 6 is an enlarged side view of one of the file teeth;

FIGS. 7 and 8 are plan and end views, respectively, of the tooth shown in FIG. 6;

FIGS. 9 and 10 are side and perspective views of a tool for producing the rasp tooth configuration.

DESCRIPTION OF THE PREFERRED EMBODIMENT

Figure 1:
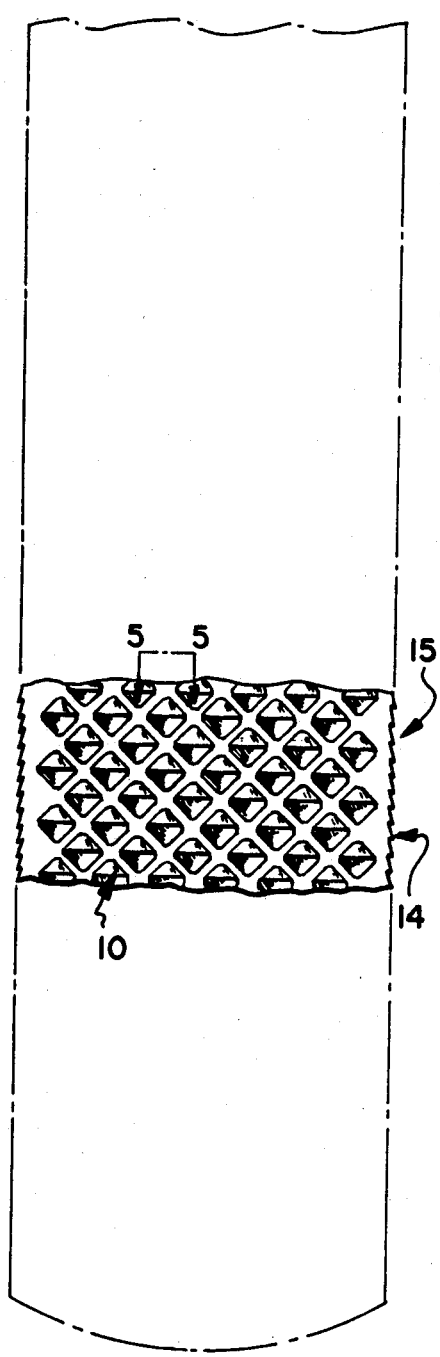
FIG. 1 is a plan view of the rasp side of a tool provided with teeth in accordance with the invention.

The file/rasp tool shown in FIG. 1 comprises a body 10 which is formed of a suitable metal blank, such as an SAE 1020 or preferably SAE 1050 hot rolled steel, which is operated upon by cutting tools to upset rows of material in predetermined shape and pattern from the surface of the blank. A cutting tool for upsetting a single rasp tooth is shown in FIGS. 9 and 10 and later described. On the rasp side of the tool barb-like projections or teeth 12 are raised from the surface of the blank. In a typical such operation the tool will form a row 14, either a tooth at a time or a row at a time. Then the blank will advance and the tool will offset to stagger the teeth as shown, and the next row 15 will be formed.

On the file side of the tool a series of spaced lance-like cuts 16 are made. These are termed the "over cut" and are relatively shallow, extending at an angle of about 35 degrees from a line transverse to the longitudinal axis of the blank, resulting in raised blade-like edges. At the intersections of the cuts there are created file teeth which have a unique scalloped configuration which is later described in detail. After the complete set of teeth is thus upset from each side of the blank, the blank will be taken to a heat treating operation where the blank will be hardened. Then the hardened blanks are subjected to a sand blasting operation which serves to sharpen the edges of the teeth. The operation so far described, except for the configurations of the teeth, is conventional.

Figure 4:
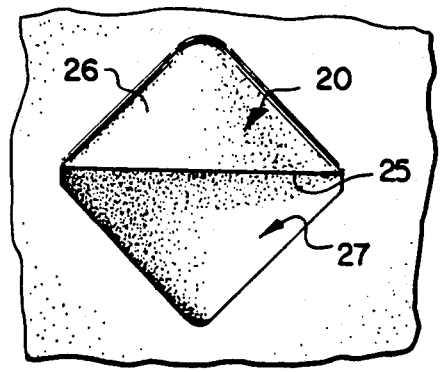
FIGS. 4 and 5 are plan and end views, respectively, of the tooth shown in FIG. 3.

According to the invention the rasp tooth cutting tool 20 (FIG. 10) performs a plurality of gouging operations on the rasp surface of the blank to form a row of projections which are each characterized by being generally in the shape of a pyramid and by having an undercut or raked front face 22 with a positive angle A in the cutting direction (as indicated by arrow 24) of about 10 to 15 degrees. As can be seen from FIGS. 1 and 4, the base orientation of this pyramid shape has the corner to opposite corner dimension aligned generally transversely of the blank, and a forward corner of the base is omitted to leave the front face, the sides of which are defined by upwardly converging edges 23 joined and surmounted by a sharpened arcuate tip 25 which provides the cutting edge of the tooth. The back wall 26 of the tooth is thus approximately the shape of a segment of the overall pyramid shape, with a corner portion removed at the front face. The radius of curvature of the tip or edge 25 is at least equal to and preferably greater than the rise R of the tooth, which is defined as the distance from the surface of the blank to the tip of the tooth farthest therefrom, and which is in the order of 1.44 to 1.70 mm., while the total tooth heigth H is in the order of 2.60 to 2.90 mm.

Figure 3:
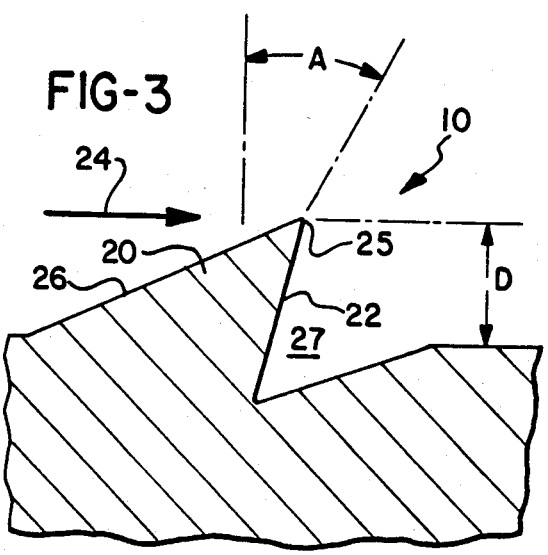
FIG. 3 is an enlarged cross-sectional side view of one of the rasp teeth.
Figure 5:
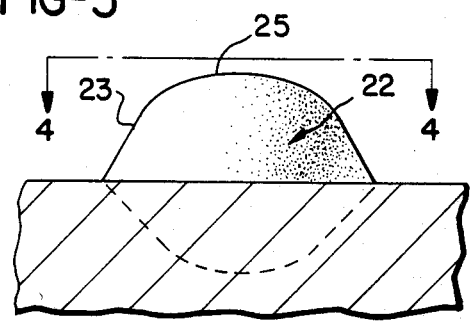

It has been found that a positive angle of about 10 to 15 degrees for the front tooth face is satisfactory to avoid a buildup of chip material in the well 27 beneath the front tooth face 22, as a result of which the rasp is essentially self-cleaning. The arcuate tip or cutting edge 25 of each tooth, as best seen in FIGS. 3 and 5, provides an elongated cutting edge which continues to present a sharp edge even as the tip of the tooth wears or dulls, thereby substantially prolonging the useful life of the rasp, and also leaving sufficient material along the top of a dull tooth to allow for re-sharpening of the tool, with consequent additional service life and savings.

On the file side of the tool the teeth 30 are located at a spacing of about 4.7 rows per cm. and at an angle of about 15 degrees from a line transverse to the longitudinal axis of the tool. The file teeth are characterized by scalloped cutting edges 32 at the top of front wall 33 which has a face angle in the order of 0 degrees (i.e. vertical) to −5 degrees. The file teeth include a cap portion 35 that extends forward in the cutting direction at an angle to the tooth forward wall 33 itself. This angle is preferably in the order of 0 degrees (i.e. vertical) to 4 degrees. The cap of the tooth occupies about 25% to 40% of the upper extremity of the tooth, and surmounts a land 37 which is formed in the back wall 38 of the file tooth by the back side of the chisel tool (not shown) which produces the "upper cut", the final cutting operation on the file side of the tool.

The rise dimension of the file teeth is in the order of 0.75 mm. to 0.85 mm., and after hardening and sharpening the caps of the file teeth present rows of file teeth characterized by the caps 35 which have a somewhat scalloped appearance and have an over-all inclination in the cutting direction.

While the form of apparatus herein described constitutes a preferred embodiment of this invention, it is to be understood that the invention is not limited to this precise form of apparatus, and that changes may be made therein without derparting from the scope of the invention which is defined in the appended claims.

What is claimed is:

1. A tool having a rasp surface with a plurality of closely spaced upstanding rasp teeth arranged in a plurality of rows, characterized by
   each of said rasp teeth having an overall shape which corresponds to a pyramid with a lower corner removed and having a cutting face at the removed lower corner which has a positive face angle and which is defined by upwardly converging side edges surmounted by a sharpened tip of generally arcuate configuration having a radius of curvature at least equal to the depth of the tooth.

2. A tool as defined in claim 1, wherein said face angle of said rasp teeth is in the order of 10 to 15 degrees.

3. A tool as defined in claim 2, wherein the rise of said rasp teeth from said rasp surface is in the order of 1.44 to 1.70 mm.

4. A tool as defined in claim 1, also including a file surface characterized by file teeth including a cap portion at the tip of each tooth and extending therefrom at an angle greater than the front face angle of said file teeth.

5. A tool as defined in claim 4, wherein said cap portions are generally arcuate, extending one from another across said file surface in spaced rows.

* * * * *